United States Patent
Sautier et al.

(10) Patent No.: US 9,709,124 B2
(45) Date of Patent: Jul. 18, 2017

(54) INSTRUMENTED DAMPER AND PERFORMANCE MONITORING SYSTEM COMPRISING SUCH A DAMPER

(71) Applicant: Hutchinson, Paris (FR)

(72) Inventors: Pascal Sautier, Paucourt (FR); Patrice Levallard, Bry sur Marne (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 14/767,302

(22) PCT Filed: Feb. 5, 2014

(86) PCT No.: PCT/IB2014/058809
§ 371 (c)(1),
(2) Date: Aug. 12, 2015

(87) PCT Pub. No.: WO2014/125399
PCT Pub. Date: Aug. 21, 2014

(65) Prior Publication Data
US 2015/0369328 A1 Dec. 24, 2015

(30) Foreign Application Priority Data
Feb. 15, 2013 (FR) ...................... 13 51311

(51) Int. Cl.
*F16F 15/00* (2006.01)
*F16F 9/32* (2006.01)
(Continued)

(52) U.S. Cl.
CPC ............... *F16F 15/00* (2013.01); *F16F 1/38* (2013.01); *F16F 9/19* (2013.01); *F16F 9/3292* (2013.01);
(Continued)

(58) Field of Classification Search
CPC ...... F16F 15/00; F16F 1/38; F16F 9/19; F16F 9/3292
See application file for complete search history.

(56) References Cited

U.S. PATENT DOCUMENTS

| | | | |
|---|---|---|---|
| 7,360,994 B2 | 4/2008 | Zoppitelli | |
| 7,719,416 B2 | 5/2010 | Arms et al. | |

(Continued)

FOREIGN PATENT DOCUMENTS

| | | |
|---|---|---|
| EP | 0 233 792 | 8/1987 |
| FR | 2 818 717 | 6/2002 |

(Continued)

OTHER PUBLICATIONS

International Search Report from International Application No. PCT/IB2014/058809, dated Mar. 13, 2014.

*Primary Examiner* — Vishal Sahni
(74) *Attorney, Agent, or Firm* — Alston & Bird LLP

(57) ABSTRACT

A damper having an external armature that is symmetric about a longitudinal axis, an internal armature that is arranged partially inside the external armature and a vibration absorber that in a damped manner couples the internal and external armatures together. The damper having •an arm parallel to the longitudinal axis, fixed in the manner of a cantilever to one of the armatures and provided with a magnetic dipole; •at least one 3D Hall-effect magnetic sensor, secured to the other armature and positioned facing the dipole parallel to the longitudinal axis and separated from the dipole by a determined gap; •at least one temperature sensor positioned in thermal contact with the vibration absorber; •at least one force sensor arranged in such a way as to generate data indicative of pressures or loads experienced by the vibration absorber; •a transmitter of the data generated by the sensors; •an electrical power supply.

15 Claims, 2 Drawing Sheets

(51) Int. Cl.
*F16F 1/38* (2006.01)
*F16F 9/19* (2006.01)

(52) U.S. Cl.
CPC ... *F16F 2230/0047* (2013.01); *F16F 2230/24* (2013.01)

(56) References Cited

U.S. PATENT DOCUMENTS

| | | | | |
|---|---|---|---|---|
| 8,018,221 | B2* | 9/2011 | Dudzik | G01R 15/207 324/117 R |
| 8,432,160 | B2* | 4/2013 | Smargiassi | 324/226 |
| 8,480,364 | B2* | 7/2013 | Altieri | G01M 1/22 415/119 |
| 8,532,845 | B2 | 9/2013 | Eberhard | |
| 8,635,916 | B1* | 1/2014 | Loverich | G01L 5/0004 73/768 |
| 2005/0120795 | A1* | 6/2005 | Nehl | B60G 17/01933 73/514.39 |
| 2010/0218564 | A1* | 9/2010 | Aisa | D06F 37/20 68/23.1 |
| 2011/0052395 | A1* | 3/2011 | Louis | B64C 27/51 416/106 |
| 2011/0062952 | A1* | 3/2011 | Smargiassi | D06F 37/20 324/226 |
| 2011/0140392 | A1* | 6/2011 | Battlogg | F16F 9/535 280/284 |

FOREIGN PATENT DOCUMENTS

| | | |
|---|---|---|
| WO | WO 2007/031821 A1 | 3/2007 |
| WO | WO 2009/083760 A1 | 7/2009 |

* cited by examiner

INSTRUMENTED DAMPER AND PERFORMANCE MONITORING SYSTEM COMPRISING SUCH A DAMPER

FIELD

The invention relates to an instrumented damper and performance monitoring system comprising such a damper.

More particularly, the invention relates to a damper equipped with a device making it possible to monitor its operational performance levels in service.

Such a damper can be used in applications (dampers, suspensions, link members) whose function is ensured by a damping means which requires, to facilitate maintenance operations, a monitoring of the operational performance levels in service by the monitoring of physical quantities such as lands, displacements, speed and temperature. For example, buffers or suspensions of trucks in the rail industry, platform supports in the fields of oil field exploration or systems used in wind turbines, or helicopter rotor drag dampers.

More specifically, the invention is particularly suited to the visco-elastic dampers, that is to say in which the damping means comprises elastomer elements.

In the description below, only the application as helicopter rotor drag dampers is described, without that constituting a limitation on the protection sought.

BACKGROUND

The helicopter rotor drag dampers are necessary systems for ensuring the stability of the rotor. The operational performance levels in terms of stiffness and of damping must be guaranteed to ensure the correct operation of the helicopter, while limiting, for example, risks of resonance on the ground. Such devices are described in the patents U.S. Pat. No. 3,758,230, FR 2592696 and FR 2 818 717.

In service, the dampers, and in particular the drag dampers, are subjected to severe static and dynamic loadings which progressively lead to a degradation of their operational performance levels (defined in stiffness and damping terms).

One possible solution for monitoring in service the performance levels of the dampers would be to regularly measure their stiffnesses and damping on a test bench. However, this operation requires the dampers to be dismantled and reassembled, which is incompatible with the operational constraints of the device on which they are mounted (trucks, oil platforms, wind turbines, helicopters, etc.).

The maintenance monitoring is therefore done, currently, without dismantling the dampers and there is only a regular visual inspection of the drag dampers to assess their state of health. The absence of visual defects is interpreted as a sign that the part still has its operational characteristics, whereas the appearance of signs of fatigue such as surface cracking of the elastomer is considered as an alert threshold leading to the removal of the dampers and the mounting of new parts in order to avoid any risk of failure in operation. In many cases, this leads to the scrapping of products whose operational performance levels may still conform to the requirements.

Parallel to this visual maintenance monitoring, numerous procedures provide for the automatic replacement of the dampers after a determined flight time. Given the manufacturing quality of the modern dampers, these procedures also lead to the scrapping of products whose operational performance levels may still conform to the requirements.

The visual maintenance monitoring is only a qualitative inspection of the state of the damper, but which does not make it possible to know the mechanical stresses which have been applied to the drag damper during its use on the ground, during pre-flight checks (almost static mechanical stresses), and during its use in flight (take-off, flying, landing; dynamic mechanical stresses).

It has already been proposed to equip certain helicopter controls with devices making it possible to ensure the acquisition and the transmission of the measurements of load passing through these controls. For example, the U.S. Pat. No. 7,719,416 describes a device for acquiring and transmitting measurements of load passing through a pitch control of a helicopter. This embodiment describes the integration, in a helicopter part, a pitch control, of an embedded measurement system that is autonomous energy-wise and communicates with a base station to transmit recorded data. The data, essentially consisting of the measurement of the loads applied to this helicopter pitch control, can serve to quantify the state of accumulated damage to this structural part or its remaining potential lifetime, via an analysis of the aggregate damage induced by the loads withstood by this structural part.

However, such an analysis relying on the aggregate of the loads does not make it possible to accurately predict the state of fatigue or of degradation of a hydraulic damper (that is to say whose vibration absorbing element consists of a liquid or a fluid), of an elastomer damper (that is to say, whose vibration absorbing element consists of an elastomer) or of an elasto-hydraulic damper (that is to say, whose vibration absorbing element consists of a combination of a liquid and of an elastomer). In effect, the laws of fatigue behavior of the vibration absorbing elements, in particular comprising an elastomer material, do not depend only on the aggregate damage based on loads but also on the entire history of the sequencing of the stresses, notably of the displacements applied.

The patents FR 2 867 152 and FR 2 961 333 describe a methodology making it possible to assess the operation of a damper, that does not require a dismantling of said damper, by analyzing only the relative displacement of the two frames forming the damper at the drag frequency of the rotor in dynamic operation.

However, neither of the patents FR 2 867 152 and FR 2 961 333 describes a device capable of implementing the method that they describe and of accessing the measurement of relative displacement of the two frames. Furthermore, the single measurement of relative displacement of the two frames does not make it possible to ensure a reliability necessary for the early detection of signs of degradation to trigger a programmed maintenance.

SUMMARY

Thus, the present invention aims to make it possible to ensure a maintenance monitoring that is reliable allowing for the early detection of signs of degradation to trigger programmed maintenance, while limiting the bulk of the monitoring system.

The invention proposes an instrumented damper allowing for an accurate measurement of the relative displacement of the two frames forming the damper and delimiting an internal space inside the damper, and a measurement of the loads and temperatures to which the damper is subjected during its use. The displacement, load and temperature sensors are arranged inside hollow frames, in the internal space of the damper.

The proposed invention makes it possible to ensure a monitoring of the operational performance levels and thus facilitate the diagnostic procedure in damper maintenance operations. The proposed device also makes it possible, in the case of drag dampers, to access, during initial in-flight tests, the essential data (the loads and the deformations) that contribute to the definition of the flight range.

To this end, the subject of the invention is a vibration damper comprising:
- a first hollow cylindrical frame, symmetrical relative to a longitudinal axis (XX'), and closed at one end;
- a second frame symmetrical relative to the longitudinal axis (XX') and arranged partially inside the first frame;
- a vibration absorbing element mechanically coupling the first and second frames together,
- an arm parallel to the longitudinal axis (XX'), fixed cantilever-fashion to just one of the first or second frames, and provided with a magnetic dipole of north-south direction parallel to the longitudinal axis (XX');
- at least one 3D Hall-effect magnetic sensor secured to the frame which does not bear the arm provided with the magnetic dipole, the 3D Hall-effect magnetic sensor being arranged facing the dipole parallel to the longitudinal axis (XX') and separated from the dipole by a determined air gap, the sensor being capable of generating data on the relative displacement of the two frames parallel to the longitudinal axis (XX');
- at least one temperature sensor arranged in thermal contact with the vibration absorbing element so as to generate temperature data;
- at least one force sensor arranged so as to generate data on pressures or loads to which the vibration damper is subjected;
- a transmitter of the displacement, temperature and load data generated by the 3D Hall-effect magnetic sensor, the temperature sensor and the force sensor;
- an electrical power supply linked electrically to the sensors and to the transmitter.

According to other embodiments:
- the transmitter can be a wireless transmitter;
- the data can be generated by the sensors continuously or according to a determined sequence, preferably at regular intervals;
- the damper can further comprise a memory for storing the data generated by the sensors;
- the power supply can comprise at least one battery;
- the power supply can comprise at least one mechanical energy harvesting system;
- the damper can further comprise a data processing unit linked electrically to the electrical power supply, and capable of processing the data generated by the sensors before their transmission by the transmitter;
- the processing of the data by the data processing unit can consist in conditioning and/or sampling the data generated by the sensors;
- the data processing unit can be a microcontroller;
- the data processing unit can be capable of comparing the processed data to a predetermined threshold value, of generating an alarm signal when the threshold value is exceeded, and of communicating this alarm signal to the transmitter;
- the vibration absorber can be a liquid and the force sensor is a liquid pressure sensor;
- the vibration absorber can consist of at least one layer of elastomer material, in which the force sensor is a load sensor arranged on the inner frame so as to generate data on load to which the second frame is subjected, the damper comprising two 3D Hall-effect magnetic sensors arranged facing and on either side of the dipole relative to the longitudinal axis (XX'), and each separated from the dipole by a determined air gap; and/or
- the load sensor can be a bridge of strain gauges secured with the second frame and arranged in such a way as to measure the axial load on the longitudinal axis (XX').

Also the subject of the invention is a system for monitoring performance of a preceding vibration damper, comprising:
- a receiver of the data generated by the sensors and transmitted by the transmitter;
- a data processing unit capable of processing the data generated by the sensors and of comparing the duly processed data to a predetermined threshold value;
- an alarm that can be activated by the data processing unit when the threshold value is exceeded.

According to a preferred embodiment, the data processing unit is a microcontroller.

BRIEF DESCRIPTION OF THE DRAWINGS

Other features of the invention will emerge from the following detailed description given with reference to the attached drawings which represent, respectively.

DETAILED DESCRIPTION

Figure 1:
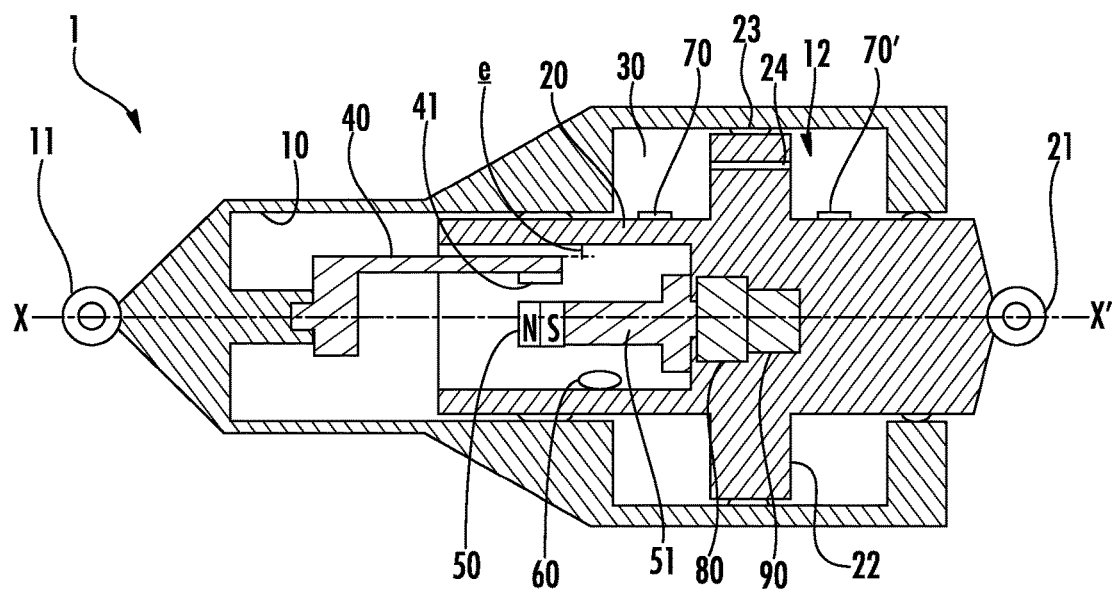
FIG. 1, a partial schematic view in cross section of an embodiment of a hydraulic damper according to the invention.

An embodiment of a hydraulic damper 1 according to the invention is partially illustrated in FIG. 1. Other types of hydraulic dampers are known to those skilled in the art who will be able to adapt the invention to the particular arrangements of these known hydraulic dampers.

The damper 1 comprises an outer, cylindrical, hollow first frame 10 that is symmetrical relative to a longitudinal axis X-X'. This outer frame 10 is closed at an end 11 situated on the left in FIG. 1. This end is intended to be fixed onto a first part of a device whose vibrations have to be damped.

The damper 1 comprises a second inner frame 20 symmetrical relative to the longitudinal axis X-X' and arranged partially inside the outer frame 10. The second inner frame is closed at an end 21 situated on the right in FIG. 1. This end 21 is intended to be fixed to a second part of the device whose vibrations have to be damped.

The first frame comprises a piston chamber 12 and the second frame comprises a piston 22 housed in the chamber 12 of the first frame. A seal 22 is provided between the piston 22 and the chamber 12. The piston comprises gauged orifices 24 to allow a passage of a vibration absorbing element 30, consisting of a fluid in the case of the hydraulic dampers. The absorbing element 30 couples, in a damped manner, the outer frame and the inner frame together as is known to those skilled in the art with regard to hydraulic dampers.

According to the invention, the damper comprises an arm parallel to the longitudinal axis X-X', fixed cantilever-fashion to the outer frame 10 and offset radially relative to the axis X-X'. The arm 40 is provided with a 3D Hall-effect magnetic sensor 41.

The damper 1 also comprises a magnetic dipole 50 of north-south direction parallel to the longitudinal axis X-X' secured to the inner frame 20 which does not bear the arm 40 provided with the magnetic sensor 41.

In the exemplary embodiment illustrated, the magnetic dipole 50 is positioned on an arm 51 parallel to the longitudinal axis X-X' and fixed cantilever-fashion to the inner frame 20.

In this way, in use, the two cantilevered arms are mobile relative to one another in the longitudinal direction X-X'.

With the hydraulic dampers allowing for an almost perfect guiding of the inner frame with respect to the outer frame, just one 3D Hall-effect sensor is needed to accurately measure the absolute position of the dipole relative to the 3D Hall-effect sensor.

A 3D Hall-effect sensor that is particularly appropriate for the implementation of the invention is the AS5410 sensor from the company AustriaMicroSystems®.

In combination, the damper according to the invention comprises a sensor 70 making it possible to obtain the loads. The embodiment of FIG. 1 being a hydraulic damper, the load sensor 70 can advantageously be a pressure sensor or, alternatively, a strain gauge, a piezoelectric sensor, etc.

Advantageously, the sensor 70 is placed on the outer side of the inner frame 20. It can be placed anywhere in the piston chamber 12. A second sensor 70' can also be provided to improve the quality of the load data.

This pressure sensor is arranged to measure the pressure of the damping liquid, so as to generate data on pressure to which the damper 1 is subjected.

The damper also comprises a temperature sensor 60 arranged in thermal contact with the damping liquid so as to generate data on the temperature of this liquid in use.

This sensor can be independent of the 3D Hall-effect magnetic sensor, as illustrated in FIG. 1.

Nevertheless, the temperature information available in the 3D Hall-effect sensor of AS5410 type, in particular, can advantageously be used as replacement for an added temperature sensor. This type of sensor therefore ensures the function of position sensor (3D Hall-effect sensor) and of temperature sensor.

All of the sensors are connected to the wired, or advantageously wireless, data transmitter 80.

This data transmitter makes it possible to transmit all the data generated by the 3D Hall-effect magnetic sensor 51, the temperature sensor 60 and the load sensor 70 to a data processing unit which can be either directly incorporated in the damper or arranged at a distance from the damper.

To this end, if the data processing unit is arranged at a distance from the damper (for example, in the onboard computer of the helicopter or in a dedicated independent diagnostic machine, the transmitter must be capable of transforming the raw signals from the sensors into data that can be transmitted (conditioning of the signals) and processed. The data are thus sent to a receiver system via a data transmitter.

If the data processing unit is directly incorporated in the damper, it is this processing unit which can be capable of transforming the raw signals from the sensors into data that can be processed and transmitted. The processing unit can optionally store the raw or processed data.

In other words, whether it is remote or incorporated in the damper according to the invention, the data processing unit is capable of processing data generated by the sensors, and it can incorporate the functions of conditioning and/or of sampling of the position, load or pressure and temperature measurement signals.

It also makes it possible to carry out a mathematical processing of the data in order to determine the stiffness of the damper, correct it if necessary as a function of the measured temperature and deduce therefrom the state of the functional performance levels of the damper.

Advantageously, the processing unit is also capable of comparing the processed data and/or the result obtained in the processing to a predetermined threshold value and of generating an alarm signal when the threshold value is exceeded.

When the data processing unit is directly incorporated in the damper, it processes the data generated by the sensors before they are transmitted by the transmitter. It can also be capable of communicating the alarm signal to the transmitter.

Advantageously, the data processing unit consists of a microcontroller.

With the data being able to be generated by the sensors in a continuous manner or according to a determined sequence, preferably at regular intervals, the damper according to the invention comprises, advantageously, a storage memory for the data generated by the sensors.

This memory may be able to be accessed by the transmitter or directly by a dedicated access with a view to a connection to a device for recovering the data stored in the memory.

Alternatively, the data processing unit can be situated at a distance from the damper according to the invention. For example, the data processing unit may be included in the onboard computer of apparatus equipped with the damper according to the invention, or included in a diagnostic device dedicated to the maintenance monitoring of the apparatus equipped with the damper according to the invention (helicopter, train, wind turbine, etc.).

The invention therefore relates also to a maintenance monitoring system comprising at least one damper according to the invention, a data processing unit independent of the damper, a receiver of the data generated by the sensors and transmitted by the transmitter of the damper or dampers and, preferentially, an alarm that can be activated by the data processing unit when the threshold value is exceeded.

In order to supply energy to the different sensors, the data transmitter 80 and, optionally, the processing unit and the memory, the vibration damper according to the invention comprises an electrical power supply 90 linked electrically to the different elements of the damper.

This electrical power supply can consist of a battery or, advantageously, of a mechanical energy harvesting system advantageously coupled to a storage battery.

Given the specific constraints concerning temperature, atmospheric pressure and, most particularly, centrifugal force, the type of battery used must be compatible with the use of the damper. A solid electrolyte battery technology, of NCA/graphite-type technology for example, is recommended in the case of the helicopter drag dampers to withstand the constant centrifugal force, greater than 400 m/s$^2$.

In a variant that is not illustrated of the damper of FIG. 1, the magnetic dipole is borne by the cantilevered arm fixed onto the outer frame and the 3D Hall-effect sensor is fixed onto the cantilevered arm secured to the inner frame.

The important thing is for the magnetic dipole to be close to the axis XX' to allow for a measurement with spurious torsion, is to allow relative longitudinal movements of the dipole and of the 3D Hall-effect sensor or sensors, representative of the relative longitudinal movements of the frames, and is to combine the displacement measurement with a load or pressure measurement and with a temperature measurement.

Thus, for example, the shafts are arranged on either side of the axis X-X', and the dipole and the 3D Hall-effect sensor are separated by an air gap that is optimized for the detection, the axis X-X' splitting the air gap into two parts.

Figure 2:
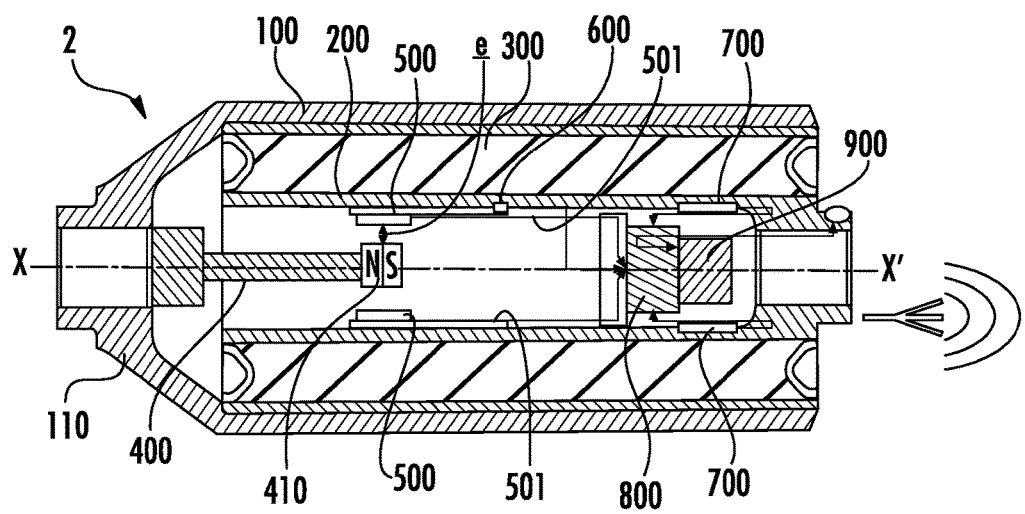
FIG. 2, a schematic view in cross section of a first embodiment of a visco-elastic damper according to the invention.
Figure 3:
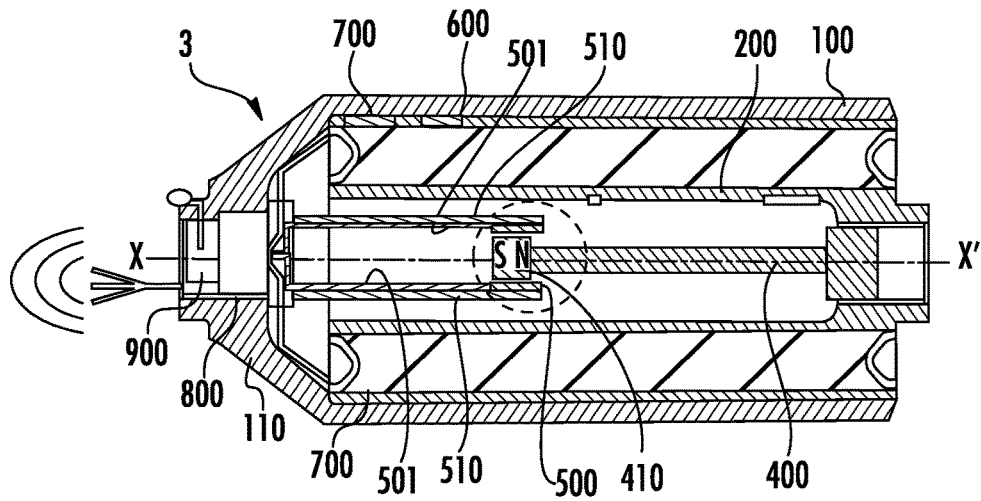
FIG. 3, a schematic view in cross section of a second embodiment of a visco-elastic damper according to the invention.

Another type of damper according to the invention is illustrated in FIGS. 2 and 3.

A first embodiment of a visco-elastic vibration damper according to the invention is illustrated in FIG. 2.

The vibration damper 2 according to the invention comprises a first outer cylindrical hollow frame 100, symmetrical relative to a longitudinal axis X-X'. The frame 100 is closed at an end 110 situated on the left in FIG. 2. This end is intended to be fixed onto a first part of a device whose vibrations have to be damped.

The damper 2 also comprises a second inner frame 200, also symmetrical relative to the longitudinal axis X-X'. This inner frame 200 is arranged partially inside the outer frame. The inner frame is closed at an end 210 situated on the right in FIG. 2. This end 210 is intended to be fixed to a second part of the device whose vibrations have to be damped.

A vibration absorbing element 300 mechanically couples the outer frame 100 and the inner frame 200 together. In the case of the visco-elastic dampers, this vibration absorbing element consists of at least one layer of elastomer material.

The absorbing element ensures the function of filtering, in frequency and/or in amplitude, of the stresses applied to one of the frames and transmitted to the other frame. This filtered transmission is advantageously damped in amplitude.

According to the invention, the vibration damper 2 comprises an arm 400 parallel to the longitudinal axis X-X'. In FIG. 2, the arm 400 is coaxial with the longitudinal axis X-X'. The arm 400 is fixed cantilever-fashion onto the outer frame 100. It is provided with a magnetic dipole 410 of north-south direction parallel to the longitudinal axis X-X'.

In the embodiment of FIG. 2, the magnetic dipole 410 is arranged at the free end of the arm 400. Nevertheless, the magnetic dipole could be situated elsewhere on the cantilevered arm provided that its north-south direction remains parallel to the longitudinal axis X-X'.

The visco-elastic damper according to the invention also comprises two 3D Hall-effect magnetic sensors 500, secured to the inner frame 200 which does not bear the arm 400 provided with the magnetic dipole 410.

The 3D Hall-effect magnetic sensors 500 are arranged facing the dipole 410 borne by the arm 400, parallel to the longitudinal axis X-X' and on either side of the longitudinal axis X-X'.

Each magnetic sensor 500 is separated from the dipole 410 by a determined air gap e.

Figure 4:
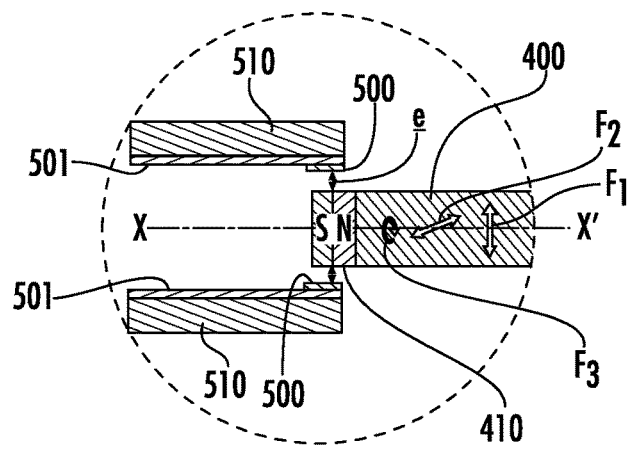
FIG. 4, a partial enlargement of the damper illustrated in FIG. 3.

The arrangement of the two 3D Hall-effect magnetic sensors 500 on either side of the magnetic dipole makes it possible to ensure a high position measurement accuracy even if the air gap e between each 3D Hall-effect sensor and the dipole does not remain constant during use. In effect, the flexibility of the elastomer material 300 allows a movement of the cantilevered arm 400 according to the arrows F1, F2 and F3 illustrated in FIG. 4, that is to say an oscillation of the dipole at right angles to the axis X-X' (F1 and F2) or a rotation of the dipole about the axis X-X' (F3). Thus, the use of at least two 3D Hall-effect magnetic sensors 500 makes it possible to correct the position values measured in a sensor operating mode close to a differential mode. This thus makes it possible to dispense with the angular and radial spurious displacements to retain only the axial displacements according to the axis X-X' and thus generate data on relative displacement of the two frames 100 and 200 parallel to the longitudinal axis X-X'.

A 3D Hall-effect sensor that is particularly appropriate for the implementation of the invention is the AS5410 sensor from the company AustriaMicroSystems®.

The use of one or more 3D Hall-effect sensors makes it possible to access the direct absolute position measurement of a mechanical element relative to another, for linear displacements having travels between these elements that can reach plus or minus 30 mm in static mode or with movement frequencies greater than 1 hertz.

The damper according to the invention also comprises at least one temperature sensor 600 arranged in thermal contact with the vibration absorbing element (here, the layer of elastomer 300), so as to monitor the temperature of the vibration absorbing element during the use of the damper.

A temperature sensor 600 that can be used is, for example, a thermocouple or a PT probe 100 incorporated in the system. This sensor will preferentially be positioned as close as possible to the elastomer element in order to obtain the most representative information. However, it will be able to be directly incorporated in the electronic board 501 bearing the 3D Hall-effect sensor.

FIG. 3 illustrates a second embodiment of a visco-elastic damper 3 according to the invention.

In this embodiment, it is the inner frame 200 which bears the cantilevered arm 400 provided with a magnetic dipole 410.

For its part, the outer frame 100 bears two cantilevered arms 510 each provided with a 3D Hall-effect magnetic sensor 500. These magnetic sensors are arranged on either side of and facing the magnetic dipole 410, parallel to the longitudinal axis X-X' and are separated from the dipole by a determined air gap e.

For the first and for the second embodiments of FIGS. 2 and 3, the 3D Hall-effect magnetic sensors 500 are fixed onto an electronic board 501 allowing for the operation of the sensors and allowing them to be supplied with energy.

In the first embodiment, the electronic boards 501 are fixed inside the hollow inner frame.

In the second embodiment of FIG. 3, the electronic boards 501 can be fixed, to the cantilevered arms 510 or constitute the cantilevered arms.

With the visco-elastic dampers allowing mutual angular, radial and axial displacements of the outer and inner frames, the air gap e between the magnetic dipole 410 and each 3D Hall-effect magnetic sensor 500 can vary during use.

Thus, the use of two 3D Hall-effect magnetic sensors 500 arranged facing and on either side of the magnetic dipole 410 relative to the longitudinal axis X-X' makes it possible to correct the measured position values by dispensing with the spurious angular and radical displacements to retain only the axial displacements.

The air gap e must be chosen to avoid any risk of contact between the dipole and the 3D Hall-effect sensors during use, while maximizing the force of the signal picked up by the 3D Hall-effect sensors.

In all the embodiments described previously, a damper according to the invention also comprises at least one force sensor 700 and at least one temperature sensor 600 combined with the displacement sensor 400-410-500.

As for the hydraulic damper illustrated in FIG. 1, all of the sensors of a visco-elastic damper according to the invention are connected to a data transmitter (wired or wireless) which makes it possible to transmit all the data generated by the sensors to a data processing unit directly incorporated in the damper or arranged at a distance from the damper.

For a hydraulic damper, the force sensor 700 consists, advantageously, to one or more pressure sensors. This pressure sensor can be complemented by a load sensor positioned on one or other of the frames.

For a visco-elastic damper according to the invention, the force sensor 700 consists of a load sensor. The latter is placed in parallel to and in contact with the inner frame in order to measure the axial load applied to the damper. For example, the load sensor can be a complete bridge of strain gauges secured, notably by bonding, with a metal frame of the damper, preferably the inner frame. The load sensor thus makes it possible to measure the axial load (on the longitudinal axis X-X').

The information supplied by the gauges gives access to the deformations of the frame in the three axes X-X', Y-Y' and Z-Z', when it is subjected to loads. A prior calibration thus makes it possible to obtain the loads in the different directions, notably in the direction X-X' which is the preferred direction of operation of the damper. An indirect measurement of the load is then obtained.

Alternatively, it is possible to envisage incorporating the load sensor in series with the damper (left end side of the frame 110 or right end side of the frame 210). This sensor will preferentially be located on the frame onto which the displacement sensor 500, the temperature sensor 600, the transmitter 800 and the electrical power supply 900 are fixed, in order to avoid having connecting wires in motion. A direct measurement of the load is then obtained.

By combining the displacement values and the load values, and by using, for example, a numerical Fairier analysis method, the functional characteristics of the damper such as the stiffness and the damping are thus accessed.

In all cases, a measurement of the temperature is necessary in order to be able to correct the measurements because the characteristics of a drag damper are thermo-dependent.

The duly obtained stiffness value is corrected as a function of the temperature measured by the temperature sensor in thermal contact with the vibration absorbing element (a liquid in the case of the hydraulic dampers and a layer of elastomer material in the case of visco-elastic dampers).

For example, a temperature sensor that can be used is a thermocouple or a PT100 probe.

When the frames are made of metal, the temperature sensor can be arranged on the inner face of the inner frame such that it measures the temperature of the vibration absorbing element by thermal conduction.

The monitoring of the quantities (displacement, load/pressure, and temperature) makes it possible to monitor the functional performance levels in service while ensuring a reliability necessary to the early detection of signs of degradation to trigger a programmed maintenance.

By virtue of the invention, it is possible to correlate the displacements with the stress conditions of the induced hydraulic load or pressure damper, which makes it possible to work back accurately to a measurement of stiffness, static or dynamic, and to the damping. The measurement of the temperature, for its part, makes it possible, by virtue of look-up tables, pre-established experimentally, which quantify the thermo-dependence of the characteristics of the damper, to know the functional characteristics that are acceptable in service (minimum values-maximum values) and compare them to the measured values.

In all the embodiments, the invention allows for a contactless measurement of position of a frame relative to another on travels of linear type with an amplitude of several mm, and that can range up to +/−30 mm depending on the dampers.

The invention therefore makes it possible, using a contactless position measurement device coupled to another force measurement which can be a load (visco-elastic damper) or a pressure (hydraulic damper), to qualify the in-service functional performance levels of a drag damper of a helicopter rotor, without dismantling the latter.

By virtue of the frictionless displacement sensor according to the invention, it is possible to know and accurately monitor the position of one frame relative to another, without affecting the operating characteristics of the damper, and in a reliable manner since there is no wear of the parts.

The invention therefore makes it possible to monitor the in-service functional performance levels of a damper without dismantling the latter.

Figure 5:
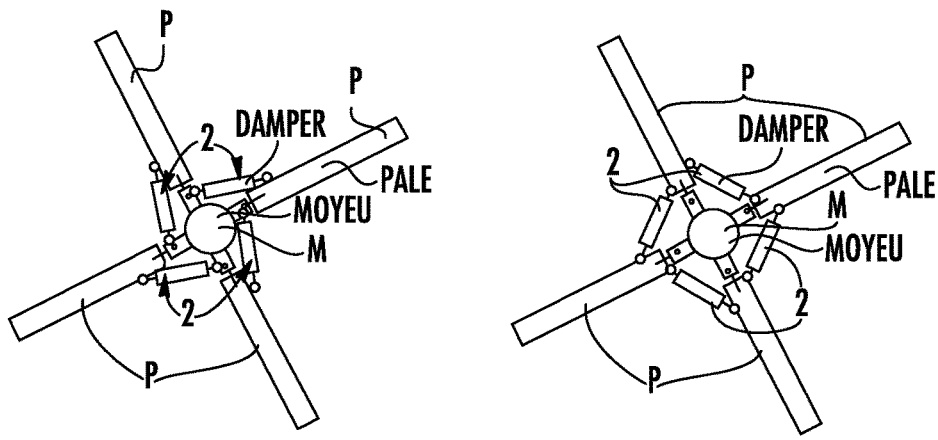
FIGS. 5 and 6, plan schematic views of two possible uses of vibration dampers according to the invention as helicopter drag damper.
Figure 6:
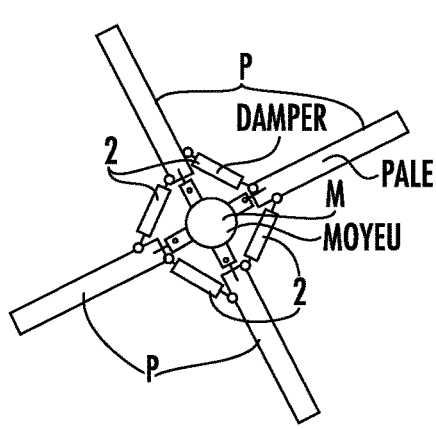

FIGS. 5 and 6 illustrate the use of four dampers 2 according to the invention for an application as drag dampers of a helicopter.

In FIG. 5, one 100 of the frames 100-200 of each damper 2 is fixed onto the hub M of the rotor, the other frame 200 of each damper 2 being fixed to a blade P of the rotor.

In FIG. 6, one 100 of the frames 100-200 of each damper 2 is fixed onto a blade P of the rotor, the other frame of each damper being fixed to a blade of the adjacent rotor.

According to other features of the invention that are not illustrated:
- The damper according to the invention can comprise one or more switches, possibly remotely controllable, and which make it possible to reactivate the system by an external action such as a specific movement or the presence of a given magnetic field.
- The processing unit can manage the modes of operation of the system which are the activation, the acquisition, the stopping of acquisition, the monitoring of a transmission request or the deactivation of the system. The tasks linked to the management of the energy that are activation, deactivation or management of the energy in the batteries or in an energy harvesting system can be delegated to a secondary processing unit driven by the main processing unit.

The invention claimed is:
1. A helicopter rotor drag damper comprising:
a first hollow cylindrical frame, symmetrical relative to a longitudinal axis, and closed at one end;
a second frame symmetrical relative to the longitudinal axis and arranged partially inside the first frame;
a vibration absorbing element mechanically coupling the first and second frames together,
wherein the helicopter rotor drag damper further comprises:
an arm parallel to the longitudinal axis, fixed cantilever-fashion to just one of the first or second frames, and provided with a magnetic dipole of north-south direction parallel to the longitudinal axis;

at least one 3D Hall-effect magnetic sensor secured to the frame which does not bear the arm provided with the magnetic dipole, the 3D Hall-effect magnetic sensor being arranged facing the dipole parallel to the longitudinal axis and separated from the dipole by a determined air gap, the sensor being capable of generating data on the relative displacement of the two frames parallel to the longitudinal axis;

at least one temperature sensor arranged in thermal contact with the vibration absorbing element so as to generate temperature data;

at least one force sensor arranged so as to generate data on pressures or loads to which the vibration damper is subjected;

a transmitter of the displacement, temperature and load data generated by the 3D Hall-effect magnetic sensor, the temperature sensor and the force sensor;

an electrical power supply linked electrically to the sensors and to the transmitter.

2. The damper as claimed in claim 1, in which the transmitter is a wireless transmitter.

3. The damper as claimed in claim 1, in which the data are generated by the sensors continuously or according to a determined sequence.

4. The damper as claimed in claim 1, further comprising a memory for storing the data generated by the sensors.

5. The damper as claimed in claim 1, in which the power supply (90, 900) comprises at least one battery.

6. The damper as claimed in claim 1, in which the power supply comprises at least one mechanical energy harvesting system.

7. The damper as claimed in claim 1, further comprising a data processing unit linked electrically to the electrical power supply, and capable of processing the data generated by the sensors before their transmission by the transmitter.

8. The damper as claimed in claim 7, in which the processing of the data by the data processing unit consists in conditioning and/or sampling the data generated by the sensors.

9. The damper as claimed in claim 7, in which the data processing unit is a microcontroller.

10. The damper as claimed in claim 7, in which the data processing unit is capable of comparing the processed data to a predetermined threshold value, of generating an alarm signal when the threshold value is exceeded, and of communicating this alarm signal to the transmitter.

11. The damper as claimed in claim 1, in which the vibration absorbing element is a liquid and the force sensor is a liquid pressure sensor.

12. The damper as claimed in claim 1, in which the vibration absorbing element consists of at least one layer of elastomer material, in which the force sensor is a load sensor arranged on the inner frame so as to generate data on load to which the second frame is subjected, the damper comprising two of said 3D Hall-effect magnetic sensors arranged facing and on either side of the dipole relative to the longitudinal axis.

13. The damper as claimed in claim 12, in which the load sensor is a bridge of strain gauges secured with the second frame and arranged in such a way as to measure the axial load on the longitudinal axis.

14. A device comprising at least one damper as claimed in claim 1 and a system for monitoring performance said damper, comprising:

a receiver of the data generated by the sensors and transmitted by the transmitter;

a data processing unit capable of processing the data generated by the sensors and of comparing the duly processed data to a predetermined threshold value;

an alarm that can be activated by the data processing unit when the threshold value is exceeded.

15. The device as claimed in claim 14, in which the data processing unit is a microcontroller.

* * * * *